United States Patent [19]

Hata et al.

[11] Patent Number: 5,665,443
[45] Date of Patent: Sep. 9, 1997

[54] HEAT SENSITIVE LABEL FOR PACKAGING A DRY-CELL BATTERY

[75] Inventors: Tetsuo Hata; Takeshi Kyogane; Masakazu Hirayama; Hiroyuki Fujita, all of Osaka, Japan

[73] Assignee: Fuji Seal, Inc., Osaka, Japan

[21] Appl. No.: 639,680

[22] Filed: Apr. 29, 1996

[30] Foreign Application Priority Data

Apr. 28, 1995 [JP] Japan ................. 7-105467

[51] Int. Cl.$^6$ ................. B32B 7/12; H01M 2/02
[52] U.S. Cl. ................. 428/34.9; 428/354; 428/480; 429/167; 429/176
[58] Field of Search ................. 428/42.1, 34.9, 428/35.9, 187, 353, 354, 355, 480; 429/167, 174, 175, 176

[56] References Cited

U.S. PATENT DOCUMENTS

| | | | |
|---|---|---|---|
| 4,287,274 | 9/1981 | Ibbotson et al. | 429/167 X |
| 4,313,986 | 2/1982 | Magnotta | 428/40.6 |
| 4,409,051 | 10/1983 | Ciliberti, Jr. | 428/41.8 X |
| 4,608,323 | 8/1986 | Zaborney | 429/167 |
| 5,240,789 | 8/1993 | Breen et al. | 429/176 |
| 5,262,251 | 11/1993 | Will et al. | 428/354 X |
| 5,292,566 | 3/1994 | Shacklett, III | 429/40.9 |
| 5,368,953 | 11/1994 | Zaborney et al. | 429/90 |

*Primary Examiner*—Daniel Zirker
*Attorney, Agent, or Firm*—Jordan and Hamburg

[57] ABSTRACT

A heat sensitive label for packaging a dry-cell battery includes a label substrate, a heat sensitive adhesive layer provided on one surface of the label substrate and a printing layer provided on an opposite surface of the label substrate, in which an ultraviolet ray curing ink is applied for the printing layer.

9 Claims, 4 Drawing Sheets

HEAT SENSITIVE LABEL FOR PACKAGING A DRY-CELL BATTERY

BACKGROUND OF THE INVENTION

This invention relates to an improvement in a heat sensitive label for packaging a dry-cell battery.

Referring to FIG. 4, a label 30, which has a label substrate 31 made of a heat shrink film, a printing layer 32 provided on one surface of the label substrate 31, and a pressure sensitive adhesive layer 33 provided on an opposite surface of the label substrate 31, is wound around a dry-cell battery and bonded to the same via the pressure sensitive adhesive layer 33. Instead of a conventional metal jacket, the label of this type is commonly used for packaging the dry-cell battery, since it can be manufactured to be thinner than the metal jacket, and is therefore advantageous in the fact that a dry-cell battery of a larger dimension can be packaged, while maintaining an outer diameter of a finished product of the battery with the label 30 thereon.

For packaging the dry-cell battery with the label 30 thereon, a release paper 34 is usually attached to an exposed surface of the pressure sensitive adhesive layer 33 provided on the opposite surface of the label substrate 31 to prevent the pressure sensitive adhesive layer 33 from bonding to unintentional portions. The release paper 34 is relatively expensive, and requires additional steps, that is, the steps of attaching the release paper to the pressure sensitive adhesive layer 33 and releasing the same therefrom. This may be troublesome and increase the manufacturing cost of the label 30.

Alternatively, there has been proposed a heat sensitive label with an adhesive layer of a heat sensitive adhesive thereon, since the heat sensitive adhesive does not possess an adhesive property until the heat sensitive label is heated to a predetermined temperature. This arrangement eliminates the necessity of the release paper 34 or the like in transportation and storing of the label 30.

However, when activating the heat sensitive adhesive of this type by heat, a printing ink of the printing layer 32 may be damaged by the heat, and consequently deteriorate the appearance of the label 30.

In addition, when the label substrate 31 of the heat shrinking film is heated to an excessively high temperature for activating the adhesive, the label substrate 31 may be shrinked and subsequently deformed and/or wrinkled.

It is an object of the present invention to provide a heat sensitive label for snugly and securely packaging the dry-cell battery in an inexpensive manner.

SUMMARY OF THE INVENTION

In accordance with the present invention, a heat sensitive label for packaging a dry-cell battery includes a label substrate, a heat sensitive adhesive layer provided on one surface of the label substrate, and a printing layer provided on an opposite surface of the label substrate, in which an ultraviolet ray curing ink is applied for the printing layer.

Further, a heat sensitive label of the present invention includes a label substrate, and a heat sensitive adhesive layer provided on one surface of the label substrate. The label substrate is made of a synthetic resin film having a heat shrinking property, a heat shrinkage percentage of 3 percent or less at 70° C., and is activated to possess an adhesive property at 70° C. or less.

In accordance with the above arrangements, since the label substrate is provided on its one surface with the heat sensitive adhesive, the release paper can be omitted. In addition, since the printing layer is provided by applying the ultraviolet ray curing ink which has excellent hardness and thermal resistance as compared with a printing ink of a commonly used type, it is unlikely that the printing layer is damaged by the heat during activation of the heat sensitive adhesive.

In case that an ultraviolet ray curing varnish is applied on an exposed surface of the printing layer, the printing layer is more effectively protected against the heat. Accordingly, the heat sensitive adhesive can be heated to a high temperature for the activation thereof without any damage, the label can be bonded to the dry-cell battery in a short period of time.

Further, in case that the label substrate is made of a heat shrink film, and the heat sensitive adhesive with such a property that it is activated at a temperature lower than that at which the label substrate is shrinked is employed for the heat sensitive adhesive layer, it is possible that the heat sensitive adhesive layer is activated, while the label substrate is prevented from shrinking.

In the present invention, a heat shrinking temperature of the label substrate refers to a temperature at which the label substrate is shrunk via heat by 1% or more (heat shrinkage percentage).

DETAILED DESCRIPTION OF THE PREFERRED EMBODIMENTS

Figure 1:
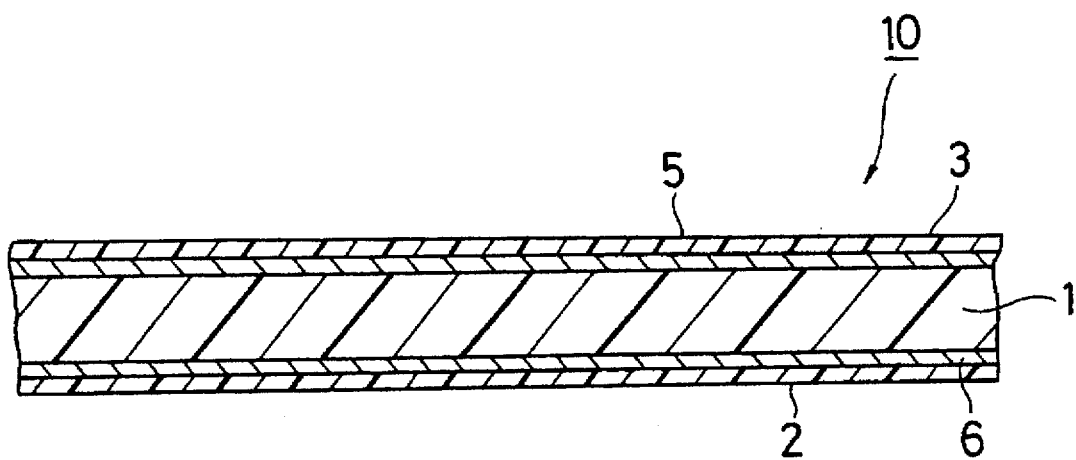
FIG. 1 is a cross section illustrating a heat sensitive label in accordance with a first embodiment of the present invention.
Figure 3C:
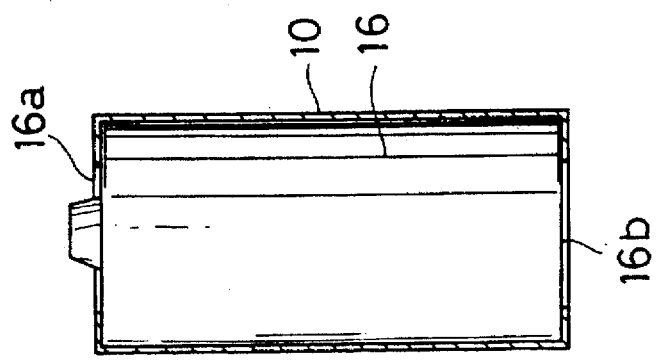
FIG. 3C is a partial cross section illustrating a heat shrinking state of the heat sensitive label.
Figure 3B:
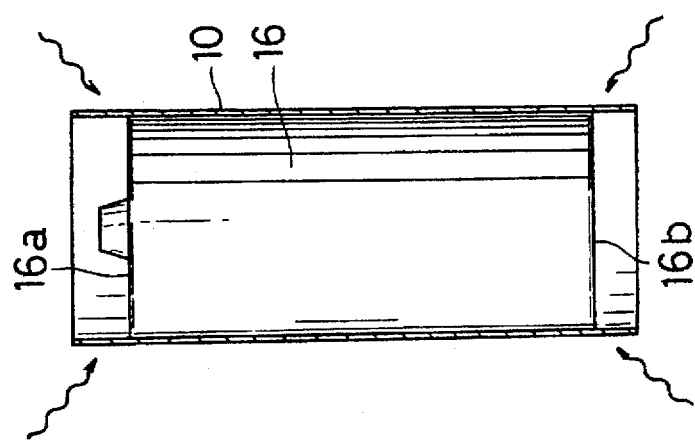
FIG. 3B is a partial cross section taken along a line of X—X of FIG. 3A.

Referring to FIG. 1, a label substrate 1 is made of a heat shrink film of polyethylene terephthalate. The label substrate 1 has a heat shrinkage percentage of 3% or less at 70° C. in the circumferential direction when it is positioned on a dry-cell battery having a cylindrical body, a planar top surface 16a and bottom surface 16b, as shown in FIG. 3B. More preferably, the heat shrinkage at 70° C. is 1 percent or less, and the heat shrinkage percentage of 10% or more at 130° C. in the circumferential direction, and more preferably 20% or more.

When the heat shrinkage percentage is less than 10 percent at 130° C., it is difficult to bring edge portions of the label extending from the top and bottom surfaces 16a, 16b of the dry-cell battery 16 into tight contact with the surfaces 16a and 16b via the heat shrinking property of the label, after the label is wrapped around the dry-cell battery 16. Therefore, the label having such a heat shrinkage percentage is not preferable for this purpose.

The label substrate 1 has a thickness of 20 to 100 μm, and more preferably 30 to 60 μm.

A heat sensitive adhesive 2 is provided on one surface of the label substrate 1 via an aluminium metallized layer 6.

Example of a hot melt adhesive include a heat fusing synthetic resin which is made of ethylene-vinyl acetate copolymer, ethylene-acrylic acid copolymer, ethylene-methacrylic acid copolymer, ionomer or a low density polyethylene, or one made of a mixture of these materials. A tackifier, for example, a terpene resin and a petroleum resin, a plasticizer of a varying type, and an addition agent, for example, a stabilizer may optionally be added to the heat sensitive adhesive layer 2 of the above composition.

The heat sensitive adhesive of the heat sensitive adhesive layer 2 is activated to possess the adhesive property at 70° C. or less, and more preferably at 65° C. or less.

The aluminium metallized layer 6 is formed on the one surface of the label substrate 1 by means of vacuum evaporation of aluminium, and has a thickness of 0.01 to 0.1 μm.

An anchor coat layer may be provided between the label substrate 1 and the aluminium metallized layer 6, and/or between the aluminium metallized layer 6 and the heat sensitive adhesive layer 2 to improve the adhesive property of these layers.

The label substrate is provided on its opposite surface with a printing layer 3 by printing an ultraviolet ray curing ink. The printing layer 3 displays a trade name, ornamental design and the like thereon. The ultraviolet ray curing ink has an excellent thermal resistance as compared with an ink of a solvent dry type which is conventionally used. As a material of the ultraviolet ray curing ink, oligomer, for example, epoxy acrylate, urethane acrylate and polyester acrylate, and polyester monomer, which selectively contains an ultraviolet ray initiator, a coloring agent, for example, a pigment, a dispersing agent and an addition agent, may be employed. Specifically, materials which are commercially available under the marks BESTCURE (Toka shikiso Kagaku K.K.), UVACE (Kuboi Ink K.K.) and CP-UV (Matsui Kagaku K.K.) are suitable for the ultraviolet ray curing ink.

The anchor coat layer may be provided between the label substrate 1 and the printing layer 3 to possess the adhesive property for the same reason as above.

An ultraviolet ray curing varnish layer 5 of a transparent type is applied on an exposed surface of the printing layer 3 to protect the printing layer 3 and obtain a glossy appearance.

To manufacture the heat sensitive label 10 of the above arrangement, the aluminium metallized layer 6 with a thickness of about 0.05 μm is formed on one surface of a lengthy film of polyethylene terephthalate with a thickness of about 50 μm. This polyethylene terephthalate film has a shrinkage percentage of 0.1% in the longitudinal direction thereof and 0% in the lateral direction thereof at 70° C., and 25% in the longitudinal direction and 4% in the lateral direction at 130° C.

An anchor coat agent is then applied on the surface, on which the aluminium metallized layer 6 has been formed. The heat fusing synthetic resin using ethylene-vinyl acetate copolymer as a main component, is then coated on the anchor coat agent by means of a melting and extruding method to form the heat sensitive adhesive layer 2 with a thickness of 20 μm.

A trade name, varying ornamental design, etc., are printed on the opposite surface of the polyethylene terephthalate film by means of a relief duplicator, using the ultraviolet ray curing ink to form the printing layer 3. The ultraviolet ray curing varnish of a transparent type is then applied on the printing layer 3 to form the varnish layer 5. The ultraviolet ray curing ink of the printing layer 3 is cured by radiating ultraviolet rays via an ultraviolet lamp whenever each color thereof is applied, and the ultraviolet ray curing varnish is cured via the ultraviolet lamp whenever it has been applied on the printing layer 3.

Thus, a plurality of the heat sensitive labels are formed, and are separated from each other by cutting predetermined portions of the lengthy film 11 to form a plurality of the individual heat sensitive labels 10, each having the above arrangement. At this time, the heat sensitive label 10 is formed so that opposite longitudinal edges of the film 11 extend in the circumferential direction of the dry-cell battery 16 when positioned thereon.

The operational steps of packaging the dry-cell battery 16 with the heat sensitive label 10 will be described hereinbelow.

Figure 2:
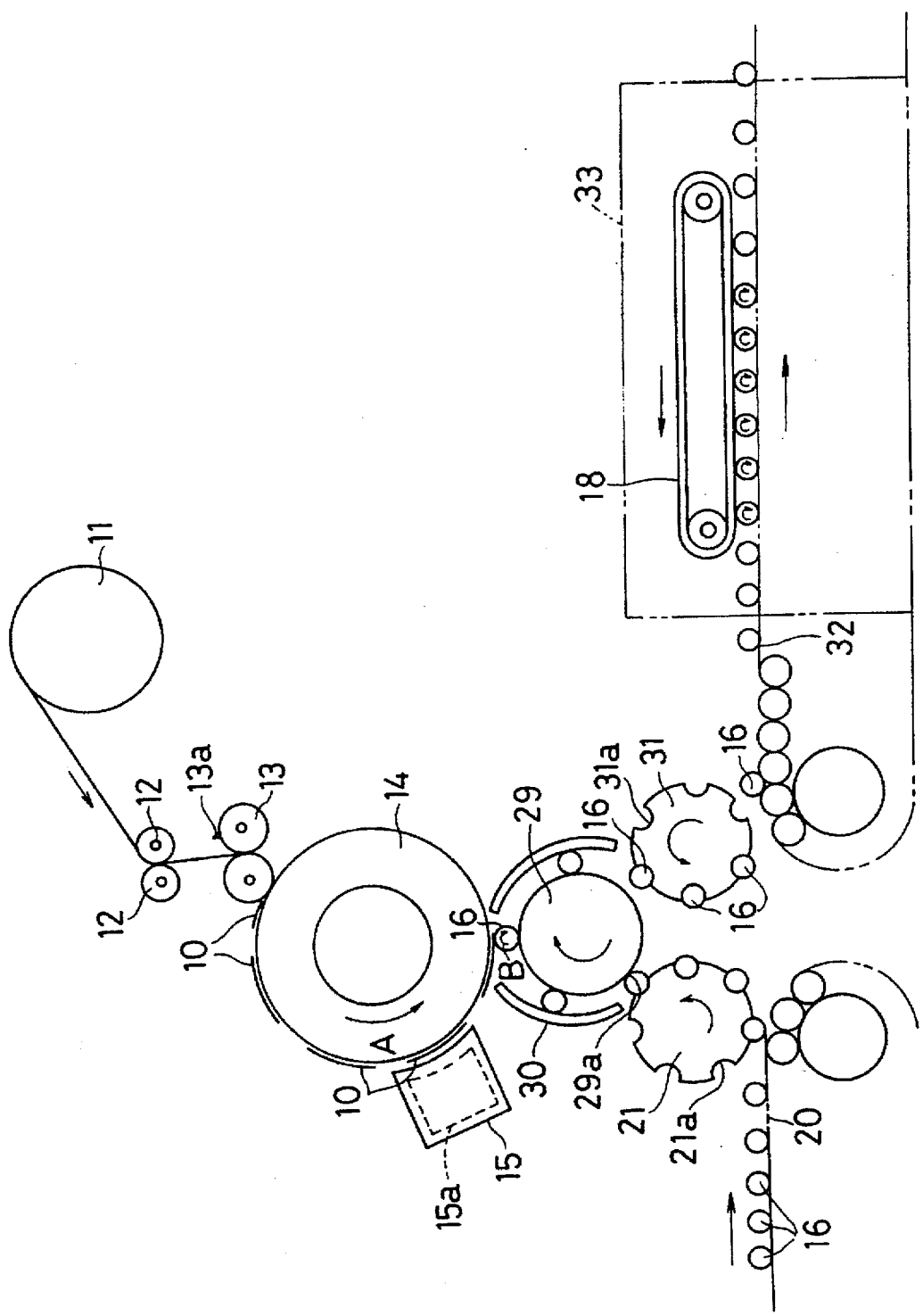
FIG. 2 is a schematic elevational view illustrating a packaging process of the heat sensitive label.

Referring to FIG. 2, the lengthy film 11 with the printing layer 3, the varnish layer 5, the aluminium metallized layer 6 and the heat sensitive adhesive layer 2 thereon is drawn from a roll, and transported via transporting rollers 12 to a cutting station, where the lengthy film 11 is cut via a cutter 13a mounted on a cutting roller 13 into the individual heat sensitive labels 10.

The heat sensitive labels 10 are successively sucked by a rotary drum 14 which moves in the direction of arrow A, so each of the heat sensitive adhesive layers 2 lies on a circumferential surface of the rotary drum 14 as it faces outwardly.

The heat sensitive labels 10 on the rotating drum 14 are transported to a heating mechanism 15, where the outermost surface of each heat sensitive label 10, that is, the heat sensitive adhesive layer 2 is heated by a heater 15a in such a manner as to be activated to possess the adhesive property. At this time, the heat sensitive adhesive layer 2 is heated to a temperature of 65° to 70° C., which temperature enables the adhesive 2 to be activated. It is preferable that the heat sensitive adhesive layer 2 is heated to such a temperature that the adhesive thereof can possess the adhesive property, while the label substrate 1 does not shrink or slightly shrinks. The heat sensitive adhesive layer 2 may be heated by heating the rotary drum 14.

On the other hand, the dry-cell batteries 16 to be packaged are successively fed to a transporting drum 21 via a conveyor 20, held by respective holding parts 21a of the transporting drum 21, transported to a place near a feeding drum 29, held by respective holding members 29a formed in a circumferential surface of the feeding drum 29, transported along a path between a guiding member 30 and the feeding drum 29, and supplied to a place near the rotary drum 14.

Figure 3A:
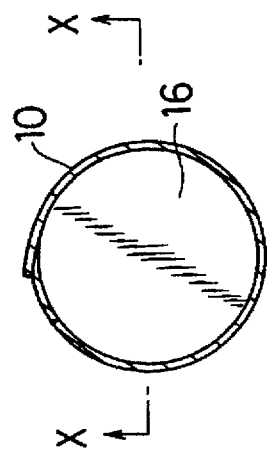
FIG. 3A is a partial cross section illustrating a dry-cell battery with the heat sensitive label thereon.
Figure 4:
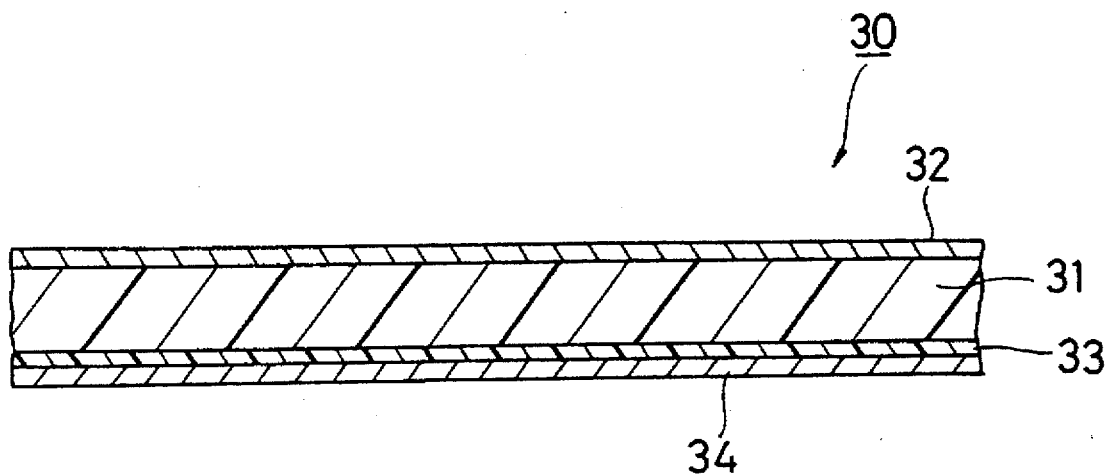
FIG. 4 is a cross section illustrating a conventional heat sensitive label.

At the time the heat sensitive label 10 with the activated heat sensitive adhesive layer 2 thereon is transported via the rotary drum 14 to a place near the dry-cell battery 16, the dry-cell battery 16 held by the holding member 29a is brought into contact with the outwardly facing surface of the heat sensitive label 10 via rotation of the feeding drum 29, and is rotated in the direction of arrow B via rotation of the rotary drum 14 so that the heat sensitive label 10 on the rotary drum 14 is wound around the cylindrical body of the dry-cell battery 16, as the heat sensitive label 10 abuts against and is bonded to the surface of the dry-cell battery 16 via the activated heat sensitive adhesive layer 2. Overlapped edges of the heat sensitive label 10 are bonded to one another via the surfaces of the heat sensitive adhesive layer 2 and the printing layer 3, as illustrated in FIG. 3A.

The dry-cell batteries 16 each having the heat sensitive label 10 thereon are then transported to a transporting drum 31 via the feeding drum 29, held by respective holding members 31a of the transporting drum 31, and mounted onto an endless belt member 32, which is rotated in the direction of the arrow so that the dry-cell batteries 16 are successively introduced into a position under a heating belt member 18 of a heating unit 33. The heating belt member 18 is heated to a temperature of about 130° C. by the heating unit 33, and positioned in such a manner as to press the cylindrical body of the dry-cell battery 16, as it is rotated to move the dry-cell batteries 16 forwardly, which movement enables the dry-cell batteries 16 to be rotated, and the entire surface of each heat sensitive label 10 to be heated and pressed by the heating belt member 18. In this regard, reapplication of the heat enables the heat sensitive adhesive layer 2 to be activated again and more securely bonded to the dry-cell battery 16 and the printing layer 3 of the overlapped edge of the heat sensitive label 10.

The heat sensitive label 10 with the ultraviolet ray curing ink and the ultraviolet ray curing varnish applied thereon is unlikely to be damaged by the heat effected by the heating belt member 18.

Referring to FIG. 3B, the heat sensitive label 10 is dimensioned in such a manner as to slightly project from the top and bottom planar surfaces 16a, 16b of the dry-cell battery 16 in a wrapping state. The dry-cell battery 16 is heated within the heating unit 33 so that the projecting portions of the heat sensitive label 10 are shrinked and bonded to the respective surfaces of the dry-cell battery 16, as illustrated in FIG. 3C.

In accordance with the above steps of bonding the heat sensitive label 10, the dry-cell battery 16 is subjected to the heat in an extremely short period of time, and therefore is unlikely to be heated to a high temperature. Thus, the heat sensitive label 10 can maintain its quality.

As being apparent from the above embodiment, in the case the heat sensitive label 10 is activated at a relatively low temperature, that is, 70° C. or less, it is not necessary to form the printing layer 3 by applying the ultraviolet ray curing ink. Instead, an ink of a common type may be used to form the printing layer 3. It is to be noted, however, that the ultraviolet ray curing ink enables the heat sensitive label 10 to be more effectively and securely bonded to the dry-cell battery 16, since the heat sensitive label 10 can be subjected to pressure and a high temperature effected by the heating belt member 18, after the heat sensitive label 10 has been bonded to the dry-cell battery 16.

Although a single layer of the polyethylene terephthalate film is employed as a material of the label substrate 1 in this embodiment, materials possessing a heat shrinking property, for example, polyethylene, polyvinyl chloride and polypropylene may be used for the label substrate 1. However, it is to be noted that a film of polyester including polyethylene terephthalate has an excellent mechanical strength and rigidity, and may not generate poisonous gases in burning, and is therefore suitable for the label substrate 1.

The label substrate 1 may be made of a film other than the heat shrink film. However, the heat shrink film enables the label substrate 1 to be easily and tightly attached to the dry-cell battery 16 via its heat shrinking property, and is therefore suitable for the label substrate 1.

It is not essential to form the ultraviolet ray curing varnish on the printing layer 3, and form the aluminium metallized layer 6 on the opposite surface of the label substrate 1.

In this embodiment, the adhesive of the heat sensitive adhesive layer 2 is activated to possess the adhesive property when heated to a temperature of 70° C. or less, and more preferably 65° C. or less. It is not essential that the adhesive is activated within such ranges. However, in case that the adhesive of the type, which is activated at an extremely high temperature, is used, the heat shrink film of the type, which does not shrink at such extremely high temperature, may be required as a material of the label substrate 1. In addtion, the application of high temperature may deteriorate the dry-cell battery. On the other hand, in case that the adhesive is activated at a relatively low temperature, some problems will be caused in storing the heat sensitive label. Therefore, it is preferable to employ the adhesive having the activation temperature of the above ranges.

In the above embodiment, the heat sensitive label 10 is heated and pressed by the heating belt member 18 to be more securely bonded to the dry-cell battery 16, after it is positioned on the dry-cell battery 16. Alternatively, the bonding state between the dry-cell battery 16 and the heat sensitive label 10 may be secured by clamping and rotating the cylindrical body of the dry-cell battery 16 with hot plates or the like, while applying a pressure. Varying application methods of the heat sensitive label 10 may be employed.

This specification is by no means intended to restrict the present invention to the preferred embodiments set forth therein. Various modifications to the heat sensitive label, as described herein, may be made by those skilled in the art without departing from the spirit and scope of the present invention as defined in the appended claims.

What is claimed is:

1. A heat sensitive label for packaging a dry-cell battery comprising a label substrate, a heat sensitive adhesive layer provided on one surface of said label substrate and a printing layer provided on another surface of said label substrate opposite said heat sensitive layer, said printing layer including an ultraviolet ray curing ink containing an ultraviolet ray initiator.

2. The heat sensitive label as set forth in claim 1, wherein said label substrate is a heat shrinkable polyester film, and further comprising an ultraviolet ray curing varnish on a surface of said printing layer opposite said label substrate.

3. The heat sensitive label as set forth in claim 1, wherein said heat sensitive adhesive is activated at a temperature lower than a temperature at which said label substrate is heat-shrinked.

4. The heat sensitive label as set forth in claim 2, wherein said heat sensitive adhesive is activated at a temperature lower than a temperature at which said label substrate is heat-shrinked.

5. The heat sensitive label as set forth in claim 1, wherein said label substrate is a heat shrinkable polyproplylene film.

6. The heat sensitive label as set forth in claim 1, further comprising an aluminum metalized layer between said label substrate and said heat sensitive adhesive layer, and an ultraviolet ray curing varnish on a surface of said printing layer opposite said label substrate.

7. A heat sensitive label for packaging a dry-cell battery comprising a label substrate, and a layer of a heat sensitive adhesive provided on one entire surface of said label substrate, said label substrate being a heat shrinkable synthetic resin film having a heat shrinkage percentage of 3% or less at 70° C., and said heat sensitive adhesive possessing an adhesive property at 70° C. or less.

8. The heat sensitive label as set forth in claim 7, wherein said label substrate is a heat shrinkable polyester film.

9. The heat sensitive label as set forth in claim 7, wherein said label substrate is a heat shrinkable polypropylene film.

* * * * *